United States Patent [19]

Shiflet

[11] Patent Number: 4,629,207
[45] Date of Patent: Dec. 16, 1986

[54] ASSEMBLY FOR CONNECTION TO A BALL HITCH

[76] Inventor: Wilbur A. Shiflet, 318 W. 5th St., Tyler, Tex. 75071

[21] Appl. No.: 795,204

[22] Filed: Nov. 5, 1985

[51] Int. Cl.$^4$ .................................................. B60D 1/06
[52] U.S. Cl. ............................. 280/506; 280/415 A; 280/507; 280/511
[58] Field of Search ............... 280/511, 504, 514, 506, 280/507, 415 A, 415 R

[56] References Cited

U.S. PATENT DOCUMENTS

| | | | |
|---|---|---|---|
| 2,321,535 | 6/1943 | Weiss | 280/506 |
| 2,371,662 | 3/1945 | Winters | 280/506 |
| 2,984,502 | 5/1961 | Tyrrell | 280/506 |

Primary Examiner—John J. Love
Assistant Examiner—Donn McGiehan
Attorney, Agent, or Firm—Warren B. Kice

[57] ABSTRACT

An assembly for connection to a ball hitch in which a ring is connected to one end of a lever and extends around the ball and a second lever is mounted on a first lever in slidable engagement therewith. The second lever defines a groove which extends over a portion of the ring to lock the levers to the ball by the spring tension of the second lever. An actuating rod is provided for sliding the second lever in a direction away from the ring to release the groove from the ring portion and unlock the levers.

14 Claims, 3 Drawing Figures

ASSEMBLY FOR CONNECTION TO A BALL HITCH

BACKGROUND OF THE INVENTION

This invention relates to an assembly for connecting to a ball hitch, and, more particularly, to an assembly for connecting to a ball hitch disposed in the bed of a vehicle in a manner so that it can be quickly released.

Ball hitches are commonly provided with heavy duty vehicles, such as tractors, for connection to external farm equipment such as plows, mowers, etc. Although ball hitches can also be installed at the rear bumper of lighter duty vehicles such as pickups, etc., for pulling relatively light loads, it is difficult, if not impossible, to pull relatively heavy loads, such as farm equipment, since the load threshold on the bumper is limited. However, it is often desirable to utilize a pickup truck, or similar vehicle, to pull farm equipment for no other reason than a pickup truck is much more comfortable than a tractor and has more conveniences such as air conditioning, etc.

SUMMARY OF THE INVENTION

It is an object of the present invention to provide an assembly for connection to a ball hitch which can be disposed in the bed of a pickup truck, or the like and, as such, can be utilized to pull relatively heavy loads.

It is a still further object of the present invention to provide an assembly of the above type which can be quick releasably connected to the vehicle.

Toward the fulfillment of these and other objects the assembly of the present invention comprises a ring connected to one end of a first lever and extending around a ball hitch which can be mounted in the bed of a pickup. A second lever is mounted over the first lever in slidable engagement therewith, and defines a groove which extends over a portion of the ring to lock the levers to the ball due to the spring tension of the second lever. An actuating rod is mounted relative to the first lever and engages the second lever for sliding the second lever in a direction away from the ring to release the groove from the ring portion and unlock the levers.

BRIEF DESCRIPTION OF THE DRAWINGS

The above brief description as well as further objects, features and advantages of the present invention will be more fully appreciated by reference to the following detailed description of presently preferred by nonetheless illustrate embodiments in accordance with the present invention when taken in conjunction with the accompanying drawings wherein.

DESCRIPTION OF THE PREFERRED EMBODIMENT

Figure 1:
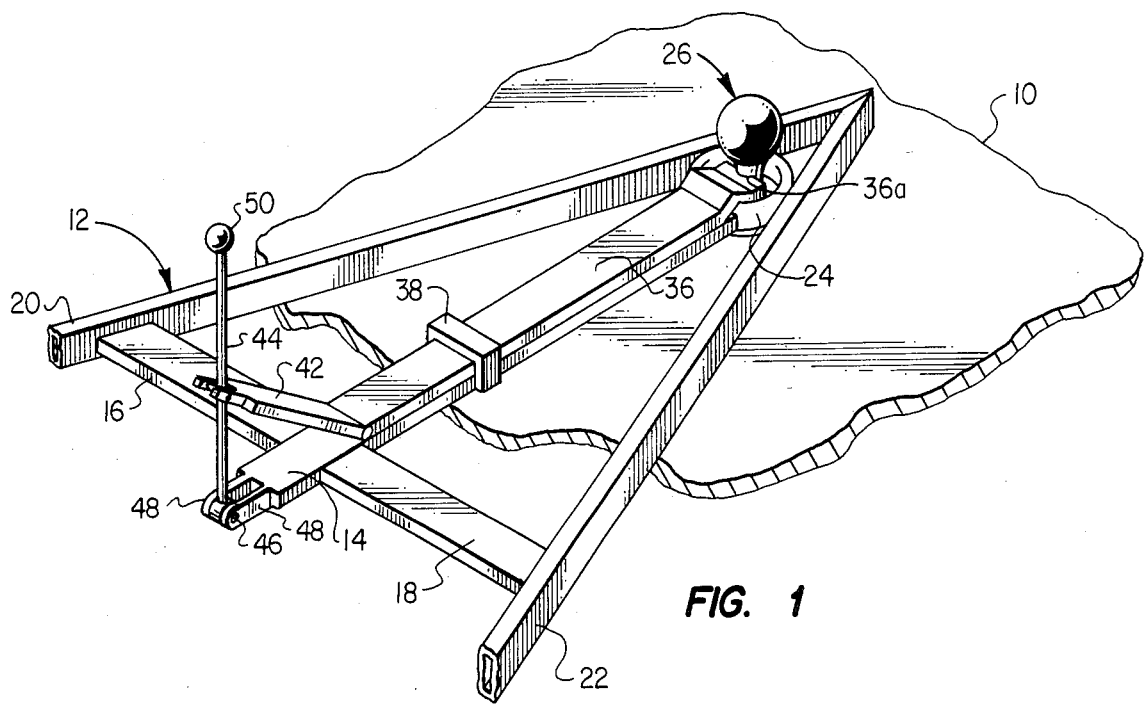
FIG. 1 is a perspective view depicting the assembly of the present invention shown connected to a ball hitch mounted on the bed of a vehicle.

Referring specifically to FIG. 1 of the drawings, the reference numeral 10 refers in general to the bed (shown partially) of a vehicle, such as a pickup truck. A frame assembly, shown in general by the reference numeral 12, rests on the bed 10 and includes a center lever 14 and two cross levers 16 and 18 connecting the center lever to a pair of angularly extending rods 20 and 22, respectively. The rods 20 and 22 are connected at their ends to form approximately a 45° angle, it being understood that the other ends of the rods 20 and 22 are adapted to be connected to external equipment such as a trailer, or the like. For example, a cross piece (not shown) can extend between the other ends of the rods 20 and 22 for receiving a pin or the like. A ring 24 is affixed to one end of the lever 14 and is secured between the rods 20 and 22.

It is understood that the various connections between the levers 14, 16 and 18, the rods 20 and 22 and the ring 24 can be made in any conventional manner such as by bolting, welding, or the like.

Figure 2:
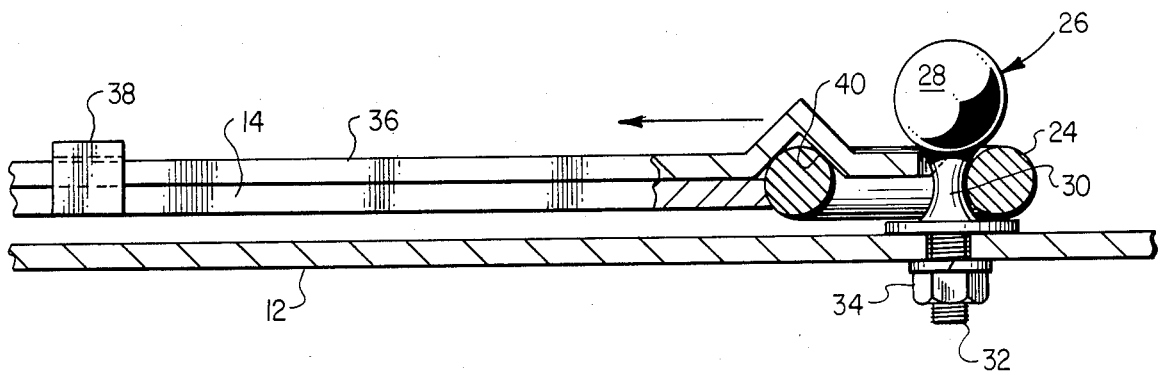
FIG. 2 is a cross-sectional view depicting the assembly of FIG. 1 in a locked position.

As better shown in FIG. 2, the ring 24 extends around a ball hitch assembly, shown in general by the reference numeral 26. The ball hitch assembly 26 comprises a ball 28, a neck portion 30, a bolt 32 extending from the neck portion and through an opening through the bed 10, and a nut 34 threaded to the bolt. It is understood that the bolt 32 can also extend through a frame portion (not shown) of the vehicle to provide a more secure connection.

Referring to FIGS. 1 and 2, a lever 36 extends over the lever 14 in slidable engagement therewith and a sleeve, or keeper 38, extends around both levers to permit slidable movement of the lever 36 on the lever 14, and to prevent relative movement of the levers in any other plane. As shown in FIG. 2 the height of the ring 24 is greater than the thickness of the lever 14 so that the upper portion of the ring projects above the upper surface of the latter lever.

The end portion of the lever 36 adjacent the ring 24 is bent in two places to form a groove 40 which, in the locked position of the levers shown in FIGS. 1 and 2, extends over a portion of the projecting portion of the ring 24. The end of the lever 36 is tapered and forms a notch 36a (FIG. 1) which, in the locked position of the levers, extends around the neck 30 of the ball hitch assembly 26. The lever 36 is therefore locked over the lever 14 by the spring tension in the lever 36.

Referring to FIG. 1, one end of a lever 42 is pivotally mounted to the other end of the lever 36 for angular movement relative thereto. The other end of the lever 42 is notched so as to receive an actuating rod 44 which is pivotally mounted to the other end of the lever 14 by a horizontal pin 46 extending through two flanges 48 projecting from the end of the lever 14. A ball 50 is mounted on the free end of the actuating rod 44 for gripping purposes.

Figure 3:
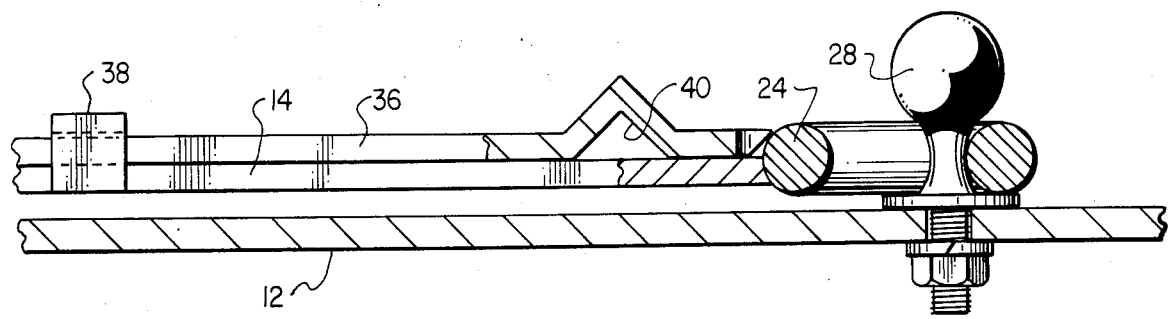
FIG. 3 is a view similar to FIG. 2 but showing the assembly of the present invention in an unlocked position.

In operation, and assuming that the lever 36 is in the locked position shown in FIGS. 1 and 2 and it is desired to unlock the levers, the actuating rod 44 is manually moved in a direction away from the ball hitch assembly 26 which causes movement of the lever 36 in the same direction. This causes the notch 36a of the lever 36 to disengage from the neck 30 and a bent portion of the lever 36 forming the groove 40 to ride upwardly on the surface of the corresponding portion of the ring 24. The corresponding end portion of the lever 36 is thus raised against its natural spring tension until the groove 40 completely clears the latter portion of the ring 24 and allows the lever 36 to move towards the position shown in FIG. 3. Upon clearing the ring 24, the lever 36 will snap back into engagement with lever 14 as shown. This frees the lever 36 from engagement with the neck portion 30 and allows the ring 24 to be removed from around the ball hitch assembly 26 and the frame assembly 12 to be removed accordingly. During the foregoing sliding movement of the lever 36 relative to the lever 14, the lever 42 pivots slightly in response to the pivotal movement of the actuating rod 44.

If it is desired to lock the assembly of the present invention relative to the bed, the ring 24 is placed around the ball hitch assembly 26 so that it and the frame assembly 22 take the position shown in FIG. 1, and the actuating rod 44 is moved toward the ball hitch assembly 26 to cause corresponding sliding movement of the lever 36 towards the latter assembly. This causes the tapered end portion of lever 36 to ride over the projecting portion of the ring portion 24 until the latter extends in the groove 40 and the notch 36a of the lever 36 extends over the neck 30 of the ball hitch assembly. As a result, the spring tension of the lever 36 acting downwardly on the lever 14 locks the assembly in the position shown in FIG. 2.

It is thus seen that the present invention provides a relatively easy, yet very efficient system of locking a frame assembly ball hitch assembly in the bed of a pickup so that the vehicle is thus adapted to pull farm equipment, or the like.

It is understood that several variations that may be made in the foregoing without departing from the scope of the invention. For example, the rods 20 and 22 of the frame assembly 12 can be formed in a telescoping arrangement to assist in disassembly, storage and the like.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. An assembly for connection to a ball hitch, said assembly comprising:
   a first lever;
   a ring connected to one end of said first lever and extending around said ball hitch;
   a second lever mounted over said first lever in slidable engagement therewith, an end portion of said second lever engaging said ball hitch and said second lever defining a groove which extends over a portion of said ring, to lock said levers to said ball hitch, and
   means for sliding said second lever in a direction away from said ring to release said groove from said ring portion and unlock said levers.

2. The assembly of claim 1 wherein a portion of said ring projects from the upper surface of said first lever for engagement by said second lever.

3. The assembly of claim 1 wherein said ball hitch comprises a ball, a neck connected at one end to said ball and means to secure the other end of said neck to the bed of a vehicle.

4. The assembly of claim 3 wherein said first lever rests on said vehicle bed.

5. The assembly of claim 3 further comprising a notch formed in said end portion of said second lever for engaging over said neck during the locking position of said levers.

6. The assembly of claim 3 wherein said ring extends around said neck and below said ball.

7. The assembly of claim 3 wherein said groove is formed by bending said second lever.

8. The assembly of claim 1 wherein said groove is released from said ring portion by overcoming the spring tension in said first lever.

9. The assembly of claim 8 wherein a portion of said second lever defining said groove provides a camming surface for engagement by said ring portion to release said groove from said ring portion during said sliding movement of said second lever to overcome said spring tension.

10. The assembly of claim 1 further comprising a frame assembly resting on said bed and connected to said first lever and said ring.

11. The assembly of claim 1 wherein said means for sliding said second lever comprises a third lever pivotally mounted to said second lever, an actuating rod pivotally mounted to said first lever and means connecting said third lever to said actuating rod so that manual pivotal movement of said rod causes slidable movement of said second lever relative to said first lever between said locking and unlocking positions.

12. The assembly of claim 1 further comprising a sleeve extending over said levers to prevent relative movement between said levers in direction other than the direction of said slidable movement.

13. The assembly of claim 1 wherein said sliding means also is adapted to slide said second lever in a direction towards said ring until said groove extends over said ring.

14. The assembly of claim 13 wherein the leading end portion of said second lever is tapered to provide a camming surface for engagement by said ring portion during the latter sliding movement of said second lever to raise said second lever and allow said groove to extend over said ring portion.

* * * * *